United States Patent [19]

Smith, Jr et al.

[11] 4,050,938

[45] Sept. 27, 1977

[54] PHOTOGRAPHIC ELEMENTS INCORPORATING CHELATED-METAL QUENCHING COMPOUNDS

[75] Inventors: Wendell F. Smith, Jr, Fairport; George A. Reynolds, Rochester, both of N.Y.

[73] Assignee: Eastman Kodak Company, Rochester, N.Y.

[21] Appl. No.: 592,300

[22] Filed: July 1, 1975

Related U.S. Application Data

[63] Continuation-in-part of Ser. No. 420,179, Nov. 29, 1973, abandoned.

[51] Int. Cl.² .................... G03C 1/84; G03C 1/76
[52] U.S. Cl. ...................... 96/84 R; 96/74; 96/82; 96/84 A; 96/84 UV
[58] Field of Search .............. 96/84 R, 84 UV, 84 A, 96/82, 74

[56] References Cited

U.S. PATENT DOCUMENTS

| | | | |
|---|---|---|---|
| 2,888,346 | 5/1959 | Tulagin et al. | 96/84 UV |
| 3,214,463 | 10/1965 | Schoenthaler et al. | 96/84 UV |
| 3,215,530 | 11/1965 | Riebel et al. | 96/84 UV |
| 3,244,524 | 4/1966 | Trucker | 96/84 UV |
| 3,296,191 | 1/1967 | Smallwood et al. | 260/45.75 |
| 3,310,575 | 3/1967 | Spivak | 260/429 |
| 3,314,794 | 4/1967 | Sawdey | 96/84 UV |

OTHER PUBLICATIONS

Schrauzer, Accounts of Chemical Research, vol. 2, pp. 72–80 (1970).
Cicchetti, Advances in Polymer Science, vol. 7, pp. 70–112 (1970).

*Primary Examiner*—Jack P. Brammer
*Attorney, Agent, or Firm*—J. G. Levitt

[57] ABSTRACT

A photographic element is disclosed containing one or more hydrophilic coatings thereon including an organic dye or precursor thereof dispersed in a water-immiscible solvent therefor. The solvent additionally includes therein a chelated-metal compound, termed a quenching compound, having a spectrophotometric absorption peak bathochromic relative to the absorption peak of the compound to be stabilized.

20 Claims, No Drawings

PHOTOGRAPHIC ELEMENTS INCORPORATING CHELATED-METAL QUENCHING COMPOUNDS

This is a continuation-in-part of copending patent application Ser. No. 420,179, filed Nov. 29, 1973, now abandoned.

BACKGROUND OF THE INVENTION

1. Field of the Invention

This invention relates to the stabilization with respect to electromagnetic radiation of organic compounds, particularly to the stabilization of dyes used in photographic applications, especially those used in photographic elements.

2. Description of the Prior Art

A need has been long recognized in the photographic arts for imaging dyes which are more resistant to fading upon extended exposure to electromagnetic radiation, such as ambient light. It is common practice to form color photographic images using combinations of dyes which form subtractive primary colors. Such subtractive primary dyes are those which absorb light predominantly in one of the blue, green and red triads of the visible spectrum thereby appearing yellow, magenta or cyan, respectively. In the most common arrangement these subtractive primary dyes lie in separate layers of the photographic element. In such photographic elements the magenta dyes have shown a particular propensity toward fading upon prolonged exposure to light.

It is known that organic dyes, such as indophenol, indoaniline, azo and azomethine dyes can be given some measure of protection against visible and ultrviolet radiation by mixing with various compounds, especially phenolic type compounds having fused heterocyclic ring systems.

It is also known to incorporate into a silver halide emulsion a mixture of colored and uncolored couplers which produce dye images of the same hue on coupling. See, for example, U.S. Pat. No. 2,428,054. This is done for purposes of masking undesired color in photographic negatives and not for purposes of imparting dye stability.

The improvement of the stability of organic substrate compounds to visible and ultraviolet light by the use of azomethine quenching compounds bathochromic to said substrate compounds is described in United States Patent Application Ser. No. 546,659 filed Feb. 3, 1975 of Smith et al. The ability of such azomethine compounds to quench singlet oxygen is also known.

Certain of the metal chelates employed in the practice of the present invention have been described by Schrauzer in Accounts of Chemical Research, Vol. 2, pp. 72 ff., March, 1969.

The use of Ni(II) chelates in the UV stabilization of polyolefins has been described by Cicchetti in Advances in Polymer Science, Vol. 7, pp. 70–112 (1970). It is pointed out in this article that the following patents relate to such stabilization: British 858,889; British 945,050; U.S. Pat. Nos. 3,296,191; 3,296,192; 2,971,941; British 943,061 and U.S. 3,310,575.

The use of certain metal (II) chelates to quench singlet oxygen in the liquid phase has been reported by Carlsson et al. in the Journal of the American Chemical Society/94:25/ Dec. 13, 1972 at pp. 8960 ff.

Bloom U.S. Pat. Nos. 3,588,216 and 3,806,462, issued June 28, 1971 and Apr. 23, 1974, disclose the use of chelated metal compounds for infrared filtering in optical elements, such as sun glasses.

SUMMARY OF THE INVENTION

In one aspect the present invention is directed to a photographic element comprised of a support and containing one or more hydrophilic coatings thereon, at least one of which is radiation-sensitive. At least one of the hydrophilic coatings includes an organic dye or dye precursor dispersed in a water-immiscible solvent. Also incorporated within the water-immiscible solvent is a stabilizing amount of a chelated-metal quenching compound. The quenching compound has its longest wavelength absorption peak bathochromic to the longest wavelength absorption peak of the organic dye and, in the presence of the organic dye, provides a quenching efficiency greater than 1.0. The quenching compound has a structure selected from the group consisting of

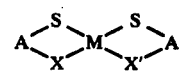

I.

and

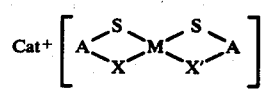

II.

wherein:

M is nickel, cobalt, copper, palladium or platinum; X and X' are independently selected from the group consisting of sulfur and oxygen; Cat+ is a cation; and A is

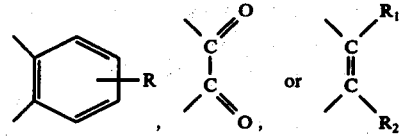

wherein R is hydrogen or alkyl, and $R_1$ and $R_2$ are independently selected from the group consisting of hydrogen, phenyl, substituted phenyl, nitrile and alkyl.

DESCRIPTION OF THE PREFERRED EMBODIMENTS

As described above, the chelated-metal quenching compounds employed in the practice of this invention are of the structure:

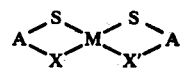

or the corresponding salt:

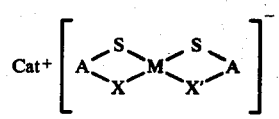

In these formulae, M can be nickel, cobalt, copper, palladium or platinum, but it is preferred that M be nickel, cobalt or copper and most preferred that it be nickel.

X and X' are independently selected from the group consisting of sulfur and oxygen. Although it is not necessary, it is preferred that both X and X' be the same atom and most preferred that they both be sulfur.

The designation Cat+ represents "cation" and any of the well-known monovalent or polyvalent, e.g., divalent, cations can be employed, e.g., sodium, potassium, ammonium, quaternary ammonium, calcium, magnesium and the like. It will be understood, of course, that where a polyvalent cation is used, there will either be more than one monovalent anionic moiety present or the anionic moiety will be correspondingly polyvalent, such that the charges will balance. Accordingly, the designation [ ]⁻ represents polyvalent as well as monovalent anions. A is

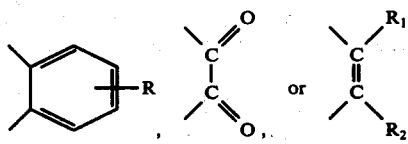

Here, R is hydrogen or alkyl, preferably of from 1 to 12 carbon atoms, e.g., methyl, ethyl, propyl, butyl, pentyl, hexyl, heptyl, octyl, nonyl, decyl, undecyl, dodecyl and isomers thereof. Most preferably, when R is alkyl, it is a lower alkyl, i.e., one having from 1 to 4 carbon atoms.

$R_1$ and $R_2$ can be the same or different and are hydrogen, phenyl, substituted phenyl, nitrile or alkyl, as described above for R and, again, preferably lower alkyl. Where a substituted phenyl moiety is employed, its substituents may, for example, be alkyl, as for R above, alkoxy, amino, acetal, carboxyl, alkoxycarbonyl, amido, alkanoyl, acyl, and the like.

The following list of structures is presented to exemplify chelated-metal compounds within the scope of the above description which are particularly useful in the practice of this invention, and are preferred.

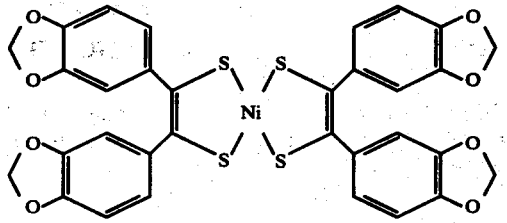

I.

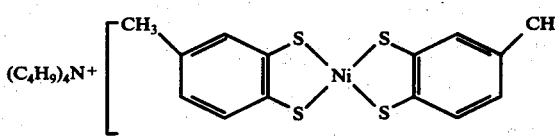

II.

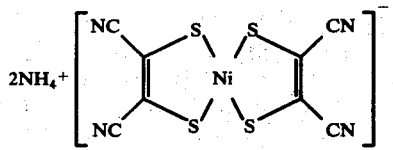

III.

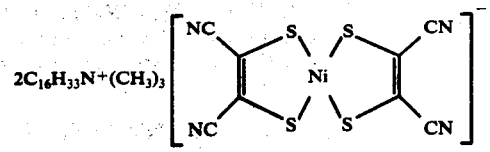

IV.

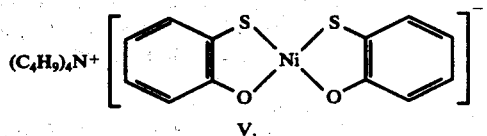

V.

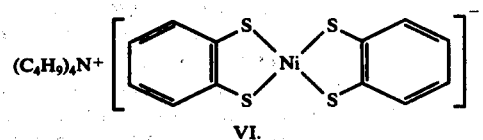

VI.

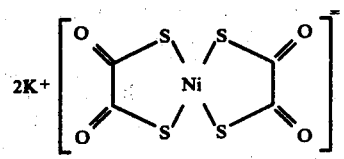

VII.

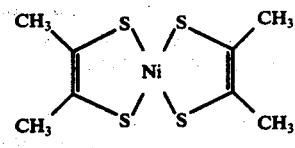

VIII.

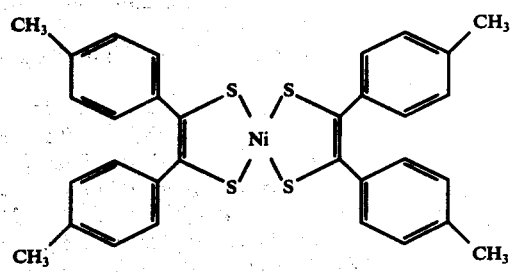

IX.

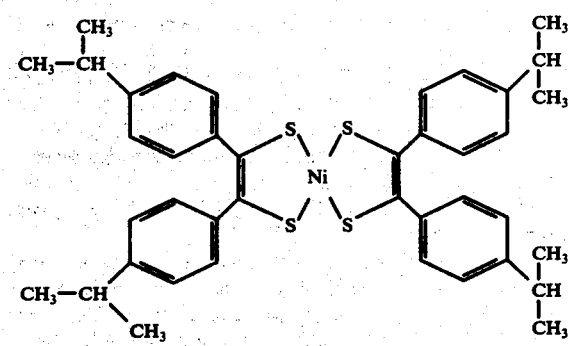

X.

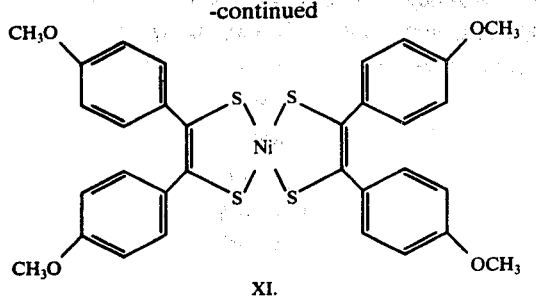

XI.

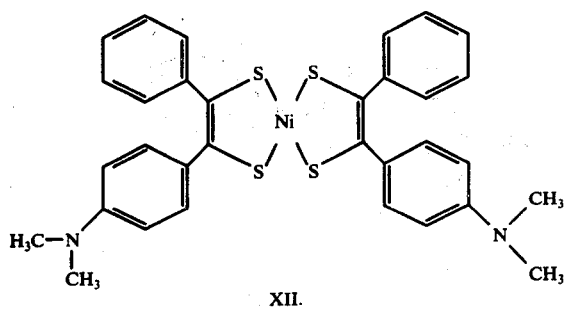

XII.

The preparation of chelated-metal compounds exemplified by compounds I - VI and VIII - XII has been described by G. N. Schrauzer, Accounts of Chemical Research, 2, 72 (1969).

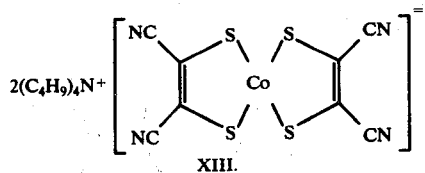

XIII.

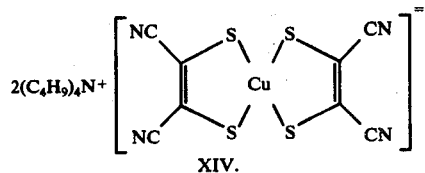

XIV.

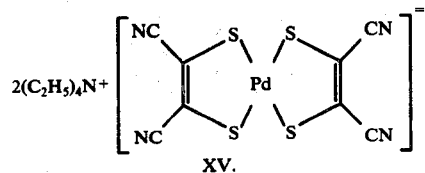

XV.

As employed herein the term "dye" is used to designate compounds having an absorption peak within the ultraviolet, visible or infrared portions of the spectrum and which can be seen with the eye—that is, which exhibit substantial absorption within the visible spectrum. The term "imaging dye" refers to conventional dyes which have been employed to form photographic images which can be seen with the eye in viewing a photographic element. For purposes of defining this invention, the term "absorption peak" refers to the principle or major spectrophotometric absorption peak of the dye or quenching compound and excludes secondary or minor absorption peaks.

Organic dyes conventionally employed in photographic elements can be stabilized against fading in a photographic element according to this invention by associating therewith as a quenching compound (or quencher) one or more of the chelated-metal quenching compounds disclosed above. The organic dye to be stabilized and the quenching compound are chosen so that the quenching compound has its longest wavelength absorption peak bathochromic to the longest wavelength absorption peak of the organic dye. The present invention is specifically applicable to a conventional photographic imaging dye having an absorption peak within the visible spectrum. While the dye to be stabilized and the quenching compound can be employed in any convenient conventional form, for most photographic applications it is preferred to incorporate a precursor of the organic dye in the photographic element. In one convenient form the imaging dye can be incorporated in the form of a precursor, such as, in the form of a conventional primary aromatic amine developing agent to form the imaging dye.

Organic dyes contemplated for use in the practice of this invention include azine dyes, oxazine dyes, thiazine dyes, anthraquinone dyes, azo dyes, azomethine dyes (including indoaniline), cyanine dyes, diphenylmethane dyes, triphenylmethane dyes, formazan dyes, induline dyes, indigoid dyes, phthalein dyes, pyronine dyes and the like, as well as precursors thereof, such as couplers which can form such dyes within a photographic imaging layer.

Photographic color couplers suitable for use in the present invention include dye-forming couplers. The couplers can be of the so-called 4-equivalent type or of the 2-equivalent type as described, for instance in Loria U.S. Pat. Nos. 3,277,155 and 3,458,315.

The yellow-dye-forming couplers generally contain methylene groups activated by at least one carbonyl group (e.g. open chain ketomethylene groups) and include beta diketones and beta ketoacylamides, such as benzoylacetanilides as well as alpha-pivalylacetanilides. Suitable couplers can be found, for instance, in U.S. Pat. Nos. 2,428,054; 2,499,966; 2,453,661; 2,778,658; 2,908,573; 3,227,550; 3,253,924; 3,277,155; 3,384,657 and British Patent No. 503,752.

Corresponding magenta-forming coupler radicals such as the 5-pyrazolones can also be employed in the present invention. Moieties of this type are exemplified, for instance, in U.S. Pat. Nos. 2,600,788; 2,725,292; 2,908,573; 3,006,759; 3,062,653; 3,152,896; 3,227,550; 3,252,924 and 3,311,476. Includable within the above class of magenta-dye-forming couplers are indazolones of the type referred to by Vittum and Weissberger in "Journal of Photographic Science", Vol. 6, 1958, pp. 158 et seq.; pyrazolino-benzimidazoles disclosed, for instance, in U.S. Pat. No. 3,061,432; pyrazolotriazoles, exemplified in Belgian Pat. No. 724,427; and 2-cyanoacetyl coumarones as exemplified, for instance, in U.S. Pat. No. 2,115,394.

Cyan-dye-forming couplers within the present invention include phenolic and alpha naphtholic compounds which are capable of reacting with oxidized color developing agents to obtain indoaniline type dyes. Compounds of this type are specifically exemplified in U.S. Pat. Nos. 2,275,292; 2,423,730; 2,474,293; 2,895,826; 2,908,573; 3,043,892; 3,227,550 and 3,253,294.

Such coupler compounds, as a general class, are further described, for instance, on pages 822-5, Vol. 5, Kirk-Othmer, Encyclopedia of Chemical Technology and in Glafkides Photographic Chemistry, Vol. 2, pages 596-614.

As mentioned above, where such couplers are used in the practice of this invention, dyes are formed therefrom by reaction with oxidized aromatic primary amine color forming silver halide developing agents.

Such developing agents include hydroquinones, catechols, aminophenols, 3-pyrazolidones, ascorbic acid derivatives, reductones and phenylenediamines. Combinations of developing agents can also be employed. The developing agents can be added from suitable solvents or in the form of dispersions as described in Yackel U.S. Pat. No. 2,592,368 issued Apr. 8, 1952 and Dunn et al. French Patent No. 1,505,778.

Suitable color photographic developers for this purpose may include, for instance, N,N-diethyl-p-phenylenediamine, N-methyl-p-phenylenediamine, N,N-dimethyl-p-phenylenediamine, 2-amino-5-diethylaminotoluene, 2-amino-5-(N-ethyl-N-laurylaminol toluene, 4-[N-ethyl-N-(beta-hydroxyethyl)amino]aniline, N-ethyl-N-beta-(methylsulfonamido)ethyl-3-methyl-4-aminoaniline and the like.

Of the foregoing dyes (which term includes the reaction products of the above mentioned couplers and developers), the preferred ones for use as organic dyes in the practice of this invention are the anthraquinone dyes, the azine dyes, the azo dyes, the azomethine dyes and the formazan dyes. The most preferred dyes for use as organic dyes in the practice of this invention are the azomethine dyes. As employed herein, an azomethine compound, or dye, is defined as any compound having the grouping:

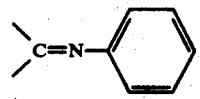

wherein the phenyl group can be unsubstituted, or substituted with any of various groups, e.g., alkyl, alkoxy, halogen, amino and the like.

Among the developing agents which can be combined with various couplers to produce organic dyes capable of being stabilized in accordance with this invention can be listed.

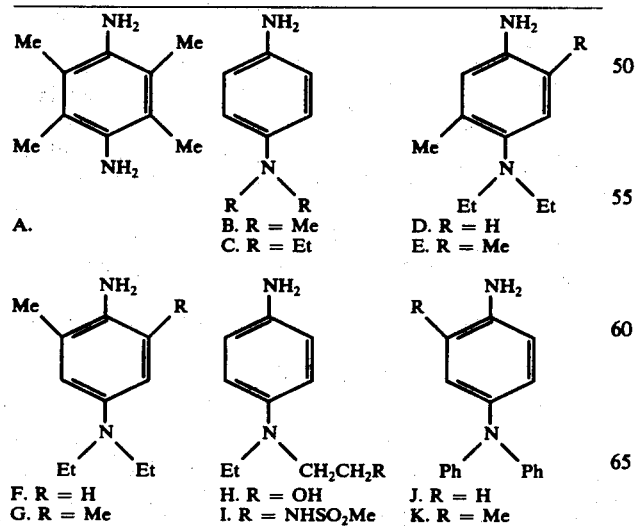

As exemplary of couplers which can be reacted with the foregoing or other developing agents to form the organic dyes can be listed:

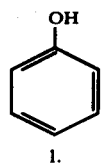

1.

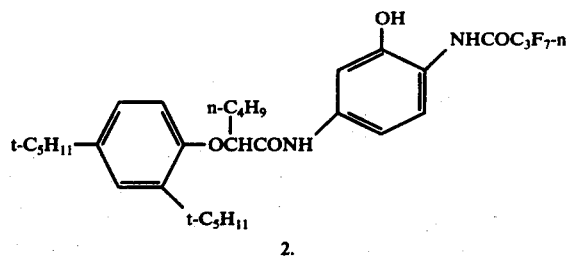

2.

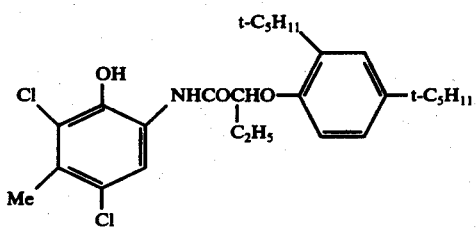

3.

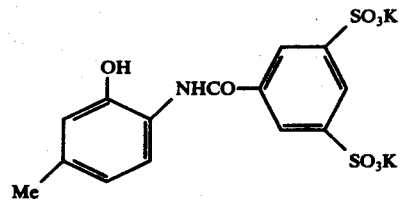

4.

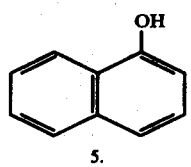

5.

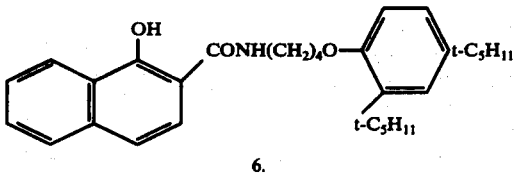

6.

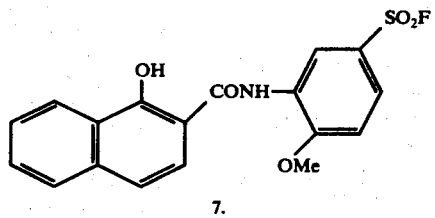

7.

-continued
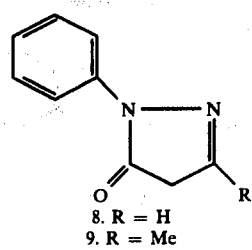
8. R = H
9. R = Me
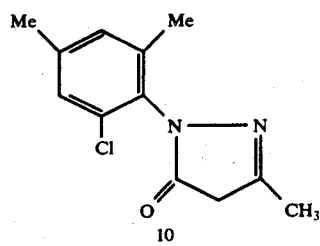
10.
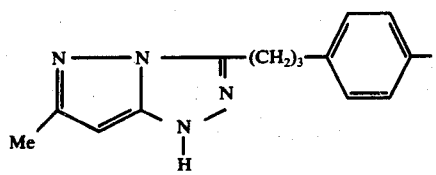
11.
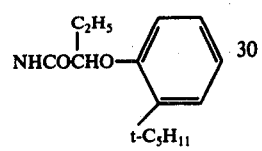
12.
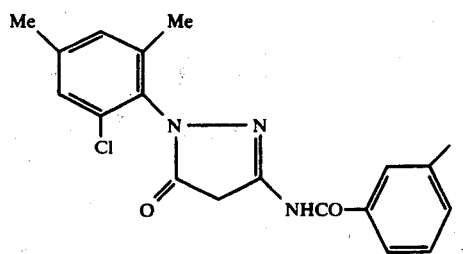
13. R = H
14. R = SO₃H
-continued
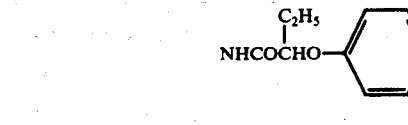
15.
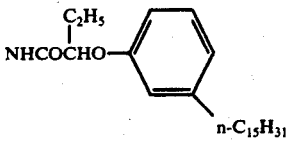
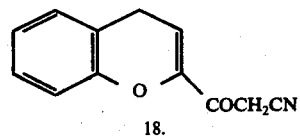
16.
17.
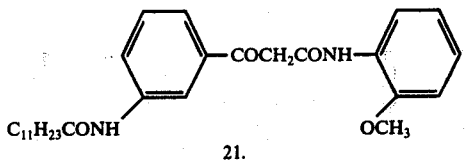
18.
NC—CH₂—CN
19.
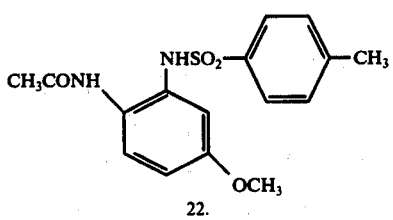
20.
21.
22.
In the foregoing structures, the designations Ph, Me and Et stand for phenyl, methyl (CH₃-) and ethyl (CH₃CH₂-), respectively.

Hereinafter, these developing agents and couplers will be referred to by the letter or number given above. Further, dyes which are the reaction products of these developers and couplers will be designated by the letter-number combination. For example, the dye formed by the reaction of developer G with coupler 9 will be referred to as G-9. It has the structure:

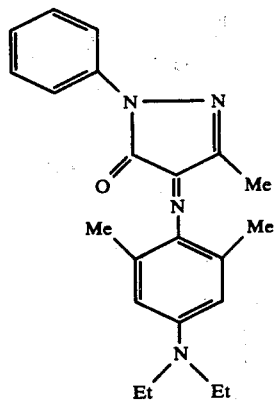

Among other dyes which can be employed as organic dyes capable of being stabilized in the practice of this invention can be listed:

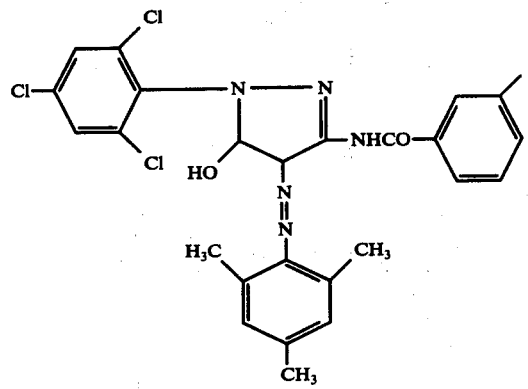
23.

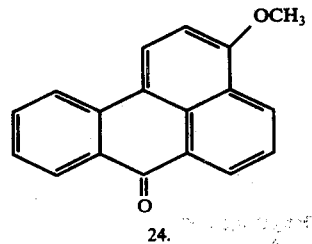
24.

-continued

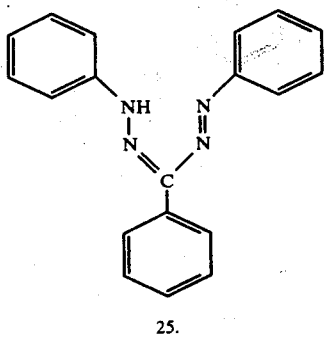
25.

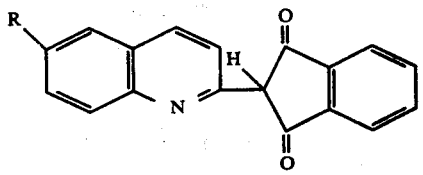
26. R = H
27. R = Me

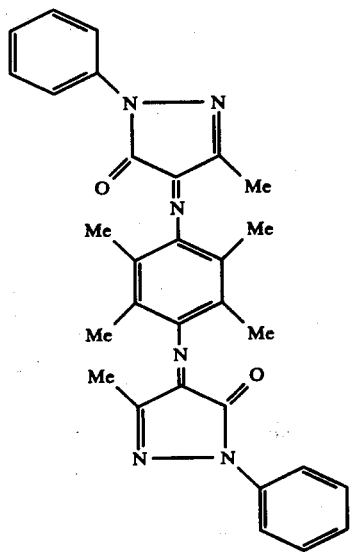
28.

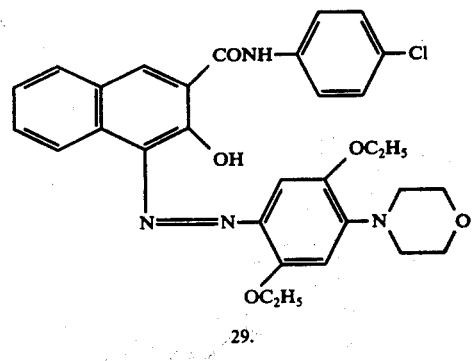
29.

-continued
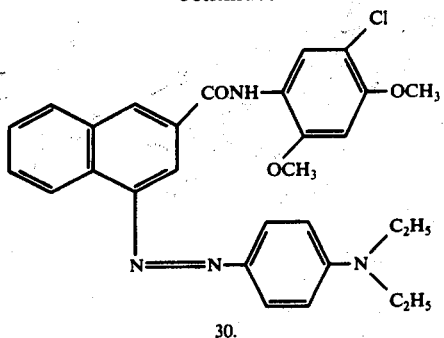
30.
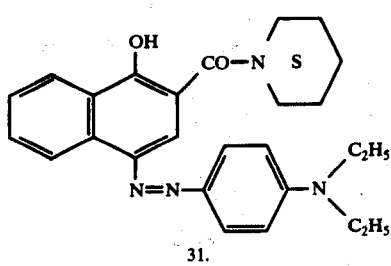
31.
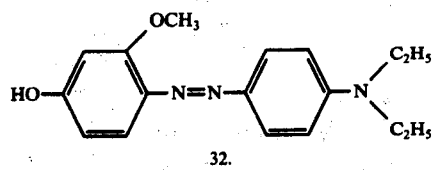
32.
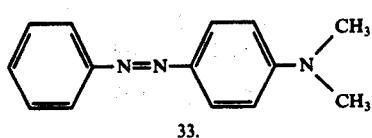
33.
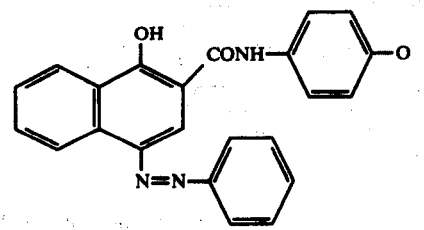
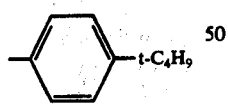
34.
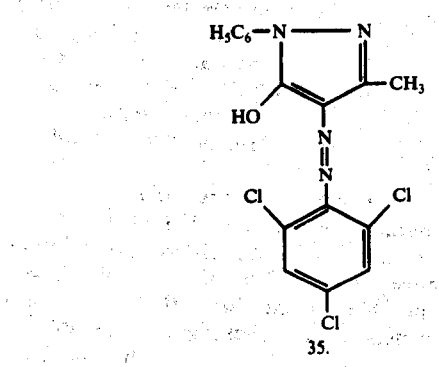
35.
-continued
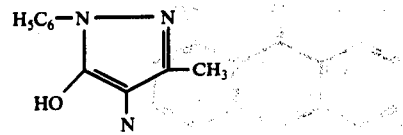
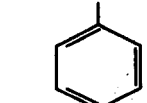
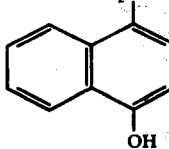
36.
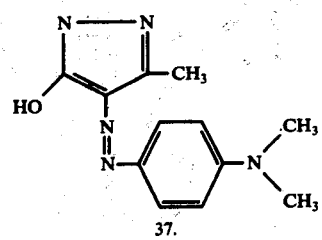
37.
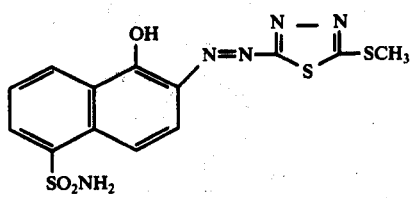
38.
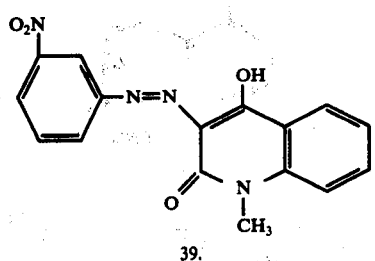
39.
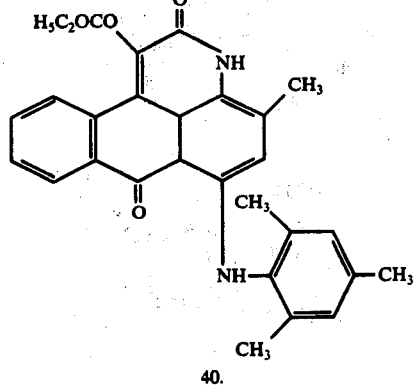
40.

-continued

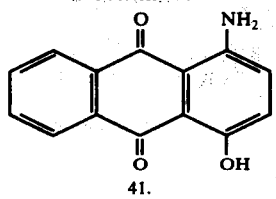
41.

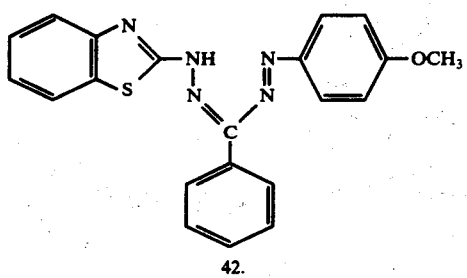
42.

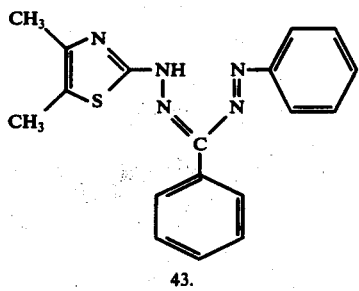
43.

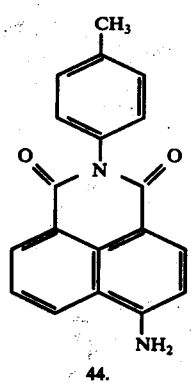
44.

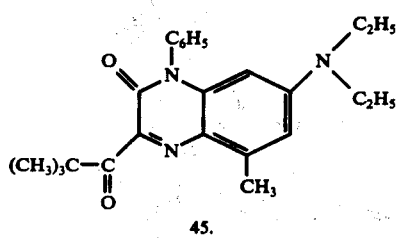
45.

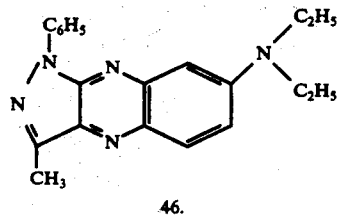
46.

-continued

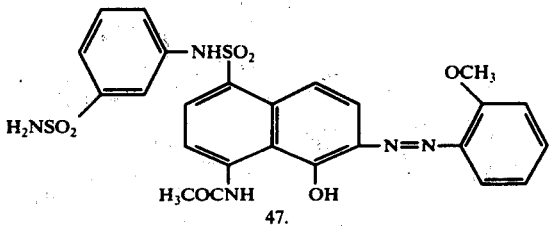
47.

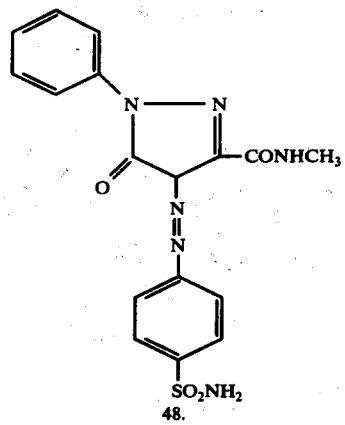
48.

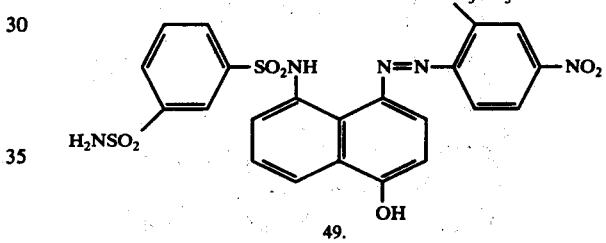
49.

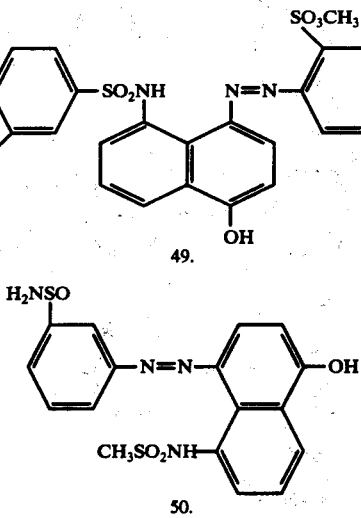
50.

As is well understood in the art, photographic elements typically include a support having coated thereon at least one hydrophilic layer. At least one of the hydrophilic layers is radiation-sensitive and is typically a photographic silver halide emulsion layer. To incorporate oleophilic organic dyes and dye precursors in the hydrophilic layers of photographic elements it is conventional practice to dissolve the organic dye or dye precursor in a water-immiscible solvent and then to disperse the solvent containing the dye or dye precursor in the hydrophilic layer. Typically the water-immiscible solvent is dispersed in the form of discrete droplets, particles, packets or the like.

We have discovered that the organic dyes incorporated in photographic elements in one or more of the hydrophilic layers in a water-immiscible solvent can be stabilized against fading by also incorporating within the water-immiscible solvent within the photographic element a chelated-metal quenching compound of the type described above. By placing the quenching compound and the organic dye within a common solvent phase within the photographic element, we have discovered that the quenching compound and the organic dye are placed in stabilizing relationship.

In a preferred form, the organic dyes are imaging dyes or imaging dye precursors, such as color couplers, dispersed in the water-immiscible solvent along with the quenching compound in a radiation-sensitive silver halide emulsion layer of a photographic element. The organic dyes or dye precursors along with the quenching compounds can be present in each of the image-forming layers of a color photographic element. In addition to the imaging layers, the organic dyes or dye precursors and quenching compounds can be present in overcoats, undercoats and interlayers of the photographic elements. The organic dye or dye precursor and quenching compound can also be present, if desired, in an antihalation or filter layer of the photographic element. They can also be present in any one of the layers contained in nonlight-sensitive parts of integral or nonintregal color transfer materials.

Useful methods of incorporating the organic dyes, dye precursors and quenching compounds in the water-immiscible solvents and dispersing the water-immiscible solvents in the hydrophilic layers of photographic elements are those described for dispersing couplers in Mannes et al. U.S. Pat. No. 2,304,939, issued Dec. 15, 1942 of Jelley et al U.S. Pat. No. 2,322,027, issued June 15, 1943, etc., in which water-immiscible organic solvents are used to dissolve the material. Other applicable methods are described in Vittum et al. U.S. Pat. No. 2,801,170 and Fierke et al U.S. Pat. No. 2,801,171 both issued July 30, 1957, and Julian U.S. Pat. No. 2,949,360 issued Aug. 16, 1960, in which low boiling or water-soluble organic solvents are used with the water-immiscible solvent. The disclosure of the patents of this paragraph are here incorporated by reference.

Water-immiscible solvents useful in dispersing the organic dye or dye precursor and chelated-metal quenching compounds of this invention include di-n-butylphthalate, benzylphthalate, triphenyl phosphate, tri-o-cresyl phosphate, diphenyl mono-p-tert-butylphenyl phosphate, monophenyl di-p-tert-butylphenyl phosphate, diphenyl mono-o-chlorophenyl phosphate, monophenyl di-o-chlorophenyl phosphate, 2,4-di-n-amylphenol, 2,4-di-t-amylphenol, N,N-diethyllauramide, etc. These solvents are high-boiling solvents (that is, having a boiling point above 175°° C) which remain in the photographic element.

Organic solvents which are readily removable from the photographic element, such as low-boiling or water-soluble organic solvents, can be used to advantage in combination with the high-boiling, water-immiscible solvents, if desired, as disclosed, for example, in Fierke et al. U.S. Pat. No. 2,801,171 and Vittum et al U.S. Pat. No. 2,801,170, both issued July 30, 1957 and Julian U.S. Pat. No. 2,949,360 issued Aug. 16, 1960, etc.

These removable organic solvents include:
1. Low-boiling, substantially water-immiscible organic solvents, such as methyl, ethyl, propyl, and butyl acetates, isopropyl acetate, ethyl propionate, sec-butyl alcohol, ethyl formate, butyl formate, nitromethane, nitroethane, carbon tetrachloride, chloroform, etc., and
2. Water-soluble organic solvents, such as methyl isobutyl ketone, $\beta$-ethoxyethyl acetate, $\beta$-butoxy-tetrahydrofurfuryl adipate, diethyleneglycol monoacetate, methoxytriglycol acetate, acetonyl acetone, diacetone alcohol, ethylene glycol, diethylene glycol, dipropylene glycol, acetone, methanol, ethanol, acetonitrile, dimethylformamide, dioxane, etc.

The stabilizing effect of the quenching compounds on the organic dyes can be stated in terms of quenching efficiency, if desired. Quenching efficiency is simply the ratio of the fading rate of the imaging dye in the absence of the quenching dye and the fading rate of the imaging dye in the presence of the quenching dye, hereinafter also indicated symbolically as $\phi_o\phi$. We have observed that azomethine dyes employed as quenchers according to our teachings produce quenching efficiencies greater than 1.0

The chelated-metal compounds employed as quenchers in the practice of this invention can vary markedly in their quenching capacity, which is the number of quenching acts accomplished by the quencher before it is finally destroyed. If the quenching capacity is greater than 1.0, one molecule of quencher will prevent the decomposition of more than one imaging dye molecule before the quencher molecule is destroyed. If the quenching capacity is equal to 1.0, the quencher is sacrificial, that is, the decomposition of the quencher is substituted for that of the imaging dye on a one-to-one basis. If the quenching capacity is less than 1.0 more than one molecular of the quencher will be destroyed in protecting one imaging dye molecule from decomposition. It is, of course, preferred to employ quenchers having a capacity greater than 1.0. Specifically preferred are chelated-metal compounds which have a quenching capacity in excess of 2.0 and, most preferably, in excess of 5.0.

Although not essential to an understanding of the term "quenching capacity" and"quenching efficiency", these terms are set out in somewhat greater detail in Belgium Patent No. 814,680, granted Nov. 7, 1974, the disclosure of which is here incorportated by reference.

Where the process of this invention is employed to improve photographic elements which are image transfer film units, there are several types known with which it is effective, e.g., colloid transfer film units, silver salt diffusion transfer film units, imbibition transfer film units and color image transfer film units. Colloid transfer film units are described in Yutzy et al,. U.S. Pat. No. 2,596,756 issued May 13, 1952 and 2,716,059 issued Aug. 23, 1953. Silver salt diffusion transfer film units are described in Rott U.S. Pat. No. 2,352,014 issued June 20, 1944; Land U.S. Pat. No. 2,543,181 issued Feb. 27, 1951; Yackel et al. U.S. Pat. No. 3,020,155 issued Feb. 6, 1962 and Land U.S. Pat. No. 2,861,885 issued Nov. 25, 1958. Imbibition transfer film units are described in Minsk U.S. Pat. No. 2,882,156 issued Apr. 14, 1959. Color image transfer film units are described in Rogers U.S. Pat. Nos. 2,087,817 issued Apr. 30, 1963; 2,185,567 issued May 25, 1965 and 2,983,606 issued May 9, 1961; Weyerts et al. U.S. Pat. No. 3,253,915 issued May 31, 1966; Whitmore et al. U.S. Pat. No. 3,227,550 issued Jan. 4, 1966; Barr et al. U.S. Pat. No. 3,227,551 issued Jan. 4, 1966; Whitmore et al. U.S. Pat. No. 3,227,552 issued Jan. 4, 1966; Land U.S. Pat. Nos. 3,415,644; 3,415,645 and 3,415,646, all issued Dec. 10, 1968; Rogers U.S. Pat. No. 3,594,164 and 3,594,165 issued July 20, 1971; and, Belgian Pat. Nos. 757,959 and 757,960 granted Apr. 23, 1971.

The quenchers and dyes as well as their precursors employed in the practice of this invention can be used with silver halide emulsions. The silver halide emulsions can comprise, for example, silver chloride, silver bromide, silver bromoiodide, silver chlorobromide, silver chloroiodide, silver chlorobromoiodide crystals or mixtures thereof. The emulsions can be coarse or fine grain emulsions and can be prepared by a variety of techniques, e.g., single jet emulsions such as those described in Trivelli and Smith, *The Photographic Journal,* Vol. LXXIX, May, 1939 (pp. 330–338), double jet emulsions such as Lippmann emulsions, ammoniacal emulsions, thiocyanate or thioether ripened emulsions such as those described in Nietz et al. U.S. Pat. No. 2,222,264 issued Nov. 19, 1940; Illingsworth U.S. Pat. No. 3,320,069 issued May 16, 1967 and McBride U.S. Pat. No. 3,271,157 issued Sept. 6, 1966. Silver halide emulsions can form latent images predominantly on the surface of the silver halide grains, or predominantly on the interior of the silver halide grains such as those described in Davey et al. U.S. Pat. No. 2,592,250 issued May 8, 1952; Porter et al. U.S. Pat. No. 3,206,313 issued Sept. 14, 1965; Berriman U.S. Pat. No. 3,367,778 issued Feb. 6, 1968 and Bacon et al. U.S. Pat. No. 3,447,927 issued June 3, 1969. If desired, mixture of such surface and internal image-informing emulsions can be made, such being described in Luckey et al. U.S. Pat. No. 2,996,382 issued Aug. 15, 1961. Silver halide emulsions can be regular grain emulsions such as the type described in Klein and Moisar, *J. Phot. Sci., Vol.* 12, No. 5, Sept/Oct, 1964, pp. 242–251 and German Patent No. 2,107,118. Negative type emulsions can be made, as well as direct positive emulsion as described in Leermakers U.S. Pat. No. 2,184,013 issued Dec. 19, 1939; Kendall et al. U.S. Pat. No. 2,541,472 issued Feb. 13, 1951; Schouwenaars British Patent No. 723,019 issued Feb. 2, 1955; Illingsworth et al. French Patent No. 1,520,821 issued Mar. 4, 1968; Illingsworth U.S. Pat. No. 3,501,307 issued Mar. 17, 1970; Ives U.S. Pat. No. 2,563,785 issued Aug. 7, 1951; Knott et al. U.S. Pat. No. 2,456,953 issued Dec. 21, 1948 and Land U.S. Pat. No. 2,861,885 issued Nov. 25, 1958.

The silver halide emulsions can be sensitized with chemical sensitizers, such as with: reducing; sulfur, selenium or tellurium compounds; gold, platinum or palladium compounds; or combinations of these. Procedures for chemically sensitizing silver halide emulsions are described in Sheppard et al. U.S. Pat. No. 1,623,499 issued Apr. 5, 1927; Waller et al. U.S. Pat. No. 2,399,083 issued Apr. 23, 1946; McVeigh U.S. Pat. No. 3,297,447 issued Jan. 10, 1967 and Dunn U.S. Pat. No. 3,297,446 issued Jan. 10, 1967.

Spectral sensitizing dyes can be used conveniently to confer additional sensitivity to light-sensitive silver halide emulsions of multilayer photographic elements. For instance, additional spectral sensitization can be obtained by treating the emulsions with a solution of a sensitizing dye in an organic solvent or the dye may be added in the form of a dispersion as described in Owens et al. British Pat. No. 1,154,781, published June 11, 1959. For optimum results, the dye can either be added to the emulsion as a final step or at some earlier stage.

Sensitizing dyes useful in sensitizing silver halide emulsions are described, for example, in Brooker et al. U.S. Pat. No. 2,526,632, issued Oct. 24, 1950; Sprague U.S. Pat. No. 2,503,776, issued Apr. 11, 1950; Brooker et al. U.S. Pat. No. 2,493,748, issued Jan. 10, 1950; and Taber et al. U.S. Pat. No. 3,384,486, issued May 21, 1968. Spectral sensitizers which can be used include the cyanines, merocyanines, complex (tri- or tetranuclear) cyanines, holopolar cyanines, styryls, hemicyanines (e.g., enamine hemicyanines), oxonols and hemioxonols.

Dyes of the cyanine classes suitable for sensitizing silver halide can contain such basic nuclei as the thiazolines, oxazolines, pyrrolines, pyridines, oxazoles, thiazoles, selenazoles and imidazoles. Such nuclei can contain alkali, alkylene, hydroxyalkyl, sulfoalkyl, carboxyalkyl, aminoalkyl and enamine groups and can be fused to carbocyclic or heterocyclic ring systems either unsubstituted or substituted with halogen, phenyl, alkyl, haloalkyl, cyano, or alkoxy groups. The dyes can be symmetrical or unsymmetrical and can contain alkyl, phenyl, enamine or heterocyclic substituents on the methine or polymethine chain.

The merocyanine dyes can contain the basic nuclei mentioned above as well as acid nuclei such as thiohydantoins, rhodanines, oxazolidenediones, thiazolidenediones, barbituric acids, thiazolineones, and malonitrile. These acid nuclei can be appropriately substituted with alkyl, alkylene, phenyl, carboxyalkyl, sulfoalkyl, hydroxyalkyl, alkoxyalkyl, alkylamino groups, or heterocyclic nuclei. Combinations of these dyes can be used, if desired. In addition, super-sensitizing addenda which do not absorb visible light can be included, for instance, ascorbic acid derivatives, azaindenes, cadmium salts, and organic sulfonic acids as described in McFall et al U.S. Pat. No. 2,933,390, issued Apr. 19, 1960; and Jones et al U.S. Pat. No. 2,937,089, issued May 17, 1960.

It is specifically contemplated to incorporate the quenching compounds in blue-sensitive (yellow dye imaging) and green-sensitive (magenta dye imaging) layers of color photographic elements.

The silver halide emulsions can contain development modifiers that function as speed increasing compounds such as polyalkylene glycols, cationic surface active agents and thioethers or combinations of these as described in Piper U.S. Pat. No. 2,886,437 issued May 12, 1959; Dann et al. U.S. Pat. No. 3,046,134 issued July 24, 1962; Carroll et al. U.S. Pat. No. 2,944,900 issued July 12, 1960 and Goffe U.S. Pat. No. 3,294,540 issued Dec. 27, 1966.

The silver halide emulsions can be protected against the production of fog and can be stabilized against loss of sensitivity during keeping. Useful antifoggants and stabilizers, each used alone, or in combination, include: a) thiazolium salts described in Brooker et al. U.S. Pat. No. 2,131,038 issued Sept. 27, 1938 and Allen et al. U.S. Pat. No. 2,694,716 issued Nov. 16, 1954; b) the azaindenes described in Piper U.S. Pat. No. 2,886,437 issued May 12, 1959 and Heimbach et al. U.S. Pat. No. 2,444,605 issued July 6, 1948; c) the mercury salts as described in Allen et al. U.S. Pat. No. 2,728,663 issued Dec. 27, 1955; d) the urazoles described in Anderson et al. U.S. Pat. No. 3,287,135 issued Nov. 22, 1966; e) the sulfocatechols described in Kennard et al. U.S. Pat. No. 3,236,652 issued Feb. 22, 1966; f) the oximes described in Carroll et al. British Patent No. 623,440 issued May 18, 1949; g) nitron; h) nitroindazoles; i) the mercaptotetrazoles described in Kendall et al. U.S. Pat. No. 2,403,927 issued July 16, 1946; Kennard et al. U.S. Pat. No. 3,266,897 issued Aug. 16, 1966; and Luckey et al. U.S. Pat. No. 3,397,987 issued Aug. 20, 1968; j) the polyvalent metal salts described in Jones U.S. Pat. No. 2,839,405 issued June 17, 1958; k) the thiuronium salts described in Herz et al. U.S. Pat. No. 3,220,839 issued Nov. 30, 1965; and l) the palladium, platinum and gold salts described in Trivelli et al. U.S. Pat. No. 2,566,263 issued Aug. 28, 1951; and Yutzy et al. U.S. Pat. No. 2,597,915 issued May 27, 1952.

The photographic and other hardenable layers, particularly gelatin-containing layers, used in these silver halide-containing photographic elements can be hardened by various organic or inorganic hardeners, alone or in combination, such as those disclosed in Mees and James, *The Theory of the Photographic Process*, pp. 54–60, 3rd Ed., MacMillan. Typical useful hardeners include the aldehydes, and blocked aldehydes as described in Allen et al. U.S. Pat. No. 3,232,764 issued Feb. 1, 1966; ketones, carboxylic and carbonic acid derivatives; sulfonate esters, sulfonyl halides; vinyl sulfonyl ethers as described in Burness et al. U.S. Pat. No. 3,539,644 issued Nov. 10, 1970; active halogen compunds; epoxy compounds, aziridines; active olefins; isocyanates; carbodiimides; chlorotriazines as disclosed in Yamamoto et al. U.S. Pat. No. 3,325,287 issued June 13, 1967, Oishi et al. U.S. Pat. No. 3,362,827 issued Jan. 9, 1968, Nishio et al. U.S. Pat. No. 3,394,006 issued July 23, 1968 and Meckl et al. U.S. Pat. No. 3,549,377 issued Dec. 22, 1970; polymeric hardeners such as oxidized polysaccharides like dialdehyde starch and oxyguargum; and the like.

The photographic silver halide emulsion layers and other hydrophilic layers of the photographic elements in which the organic dyes or dye precursors, quenchers and water-immiscible solvents can be incorporated can contain various colloids alone or in combination as vehicles. Suitable hydrophilic vehicle materials include both naturally-occurring substances such as proteins, for example, geltin, gelatin derivatives, cellulose derivatives, polysaccharides such as dextran, gum arabic and the like; and synthetic polymeric substances such as water soluble polyvinyl compounds like poly(vinylpyrolidone), acrylamide polymers and the like.

Photographic emulsion layers and other layers of photographic elements such as overcoat layers, interlayers and subbing layers, as well as receiving layers in image transfer elements can also contain alone or in combination with hydrophilic, water-permeable colloids, other synthetic polymeric vehicle compounds such as dispersed vinyl compounds such as in latex form and particularly those which increase the dimensional stability of the photographic materials. Typical synthetic polymers include those described in Nottorf U.S. Pat. No. 3,142,568 issued July 28, 1964; White U.S. Pat. No. 3,193,386 issued July 6, 1965; Houck et al. U.S. Pat. No. 3,062,674 issued Nov. 6, 1962; Houck et al. U.S. Pat. No. 3,220,844 issued Nov. 30, 1965; Ream et al. U.S. Pat. No. 3,287,289 issued Nov. 22, 1966; and Dykstra U.S. Pat. No. 3,411,911 issued Nov. 19, 1968. Other vehicle materials include those water-insoluble polymers of alkyl acrylates and methacrylates, acrylic acid, sulfoalkyl acrylates or methacrylates, those which have crosslinking sites which facilitate hardening or curing as described in Smith U.S. Pat. No. 3,488,708 issued Jan. 6, 1970, and those having recurring sulfobetaine units as described in Dykstra Canadian Pat. No. 774,054.

The photographic elements often contain antistatic or conducting layers. Such layers can comprise soluble salts, e.g. chlorides, nitrates, etc., evaporated metal layers, ionic polymers such as those described in Minsk U.S. Pat. No. 2,861,056 issued Nov. 18, 1958 and Sterman et al. U.S. Pat. No. 3,206,312 issued Sept. 14, 1965, or insoluble inorganic salts such as those described in Trevoy U.S. Pat. No. 3,428,451 issued Feb. 18, 1969.

Photographic layers, including silver halide emulsion layers of a photographic element, can be coated on a wide variety of supports. Typical supports include cellulose nitrate film, cellulose acetate film, poly(vinyl acetal) film, polystyrene film, poly(ethylene terephthalate) film, polycarbonate film and related films or resinous materials, as well as glass, paper, metal and the like. Typically, a flexible support is employed, especially a paper support, which can be partially acetylated or coated with baryta and/or in alpha-olefin polymer, particularly a polymer of an alpha-olefin containing 2 to 10 carbon atoms such as polyethylene, polypropylene, ethylenebutene copolymers and the like.

The photographic layers can contain surfactants such as saponin; anionic compounds such as the alkyl aryl sulfonates described in Baldsiefen U.S. Pat. No. 2,600,831 issued June 17, 1952; amphoteric compounds such as those described in Ben-Ezra U.S. Pat. No. 3,133,816 issued May 19, 1964; and water soluble adducts of glycidol and an alkyl phenol such as those described in Olin Mathieson British Patent No. 1,022,878 issued Mar. 16, 1966, and Knox U.S. Pat. No. 3,514,293 issued May 26, 1970.

Any quantity of quencher will bring about the improvements of this invention. There is, theoretically, no upper limit to the amount which can be employed, since having an excess will do no harm except possibly lend unwanted color to the article. It is preferred that there be at least 0.25 micromole of quencher per gm of the water-immiscible solvent in photographic applications and most preferred that there be from about 2.5 micromole to about 250micromoles of quencher per gram of water-immiscible solvent.

In general, the organic dye (or precursor thereof) concentration will be equal to that ordinarily employed in photography. These concentrations are well known to those of ordinary skill in the art of color photography. Preferably, the imaging dye or precursor will be present in the coating in a range of from about 2.5 micromole per gram of water-immiscible solvent to about 250 micromoles per gram of water-immiscible solvent. Most preferably, it will be present in a range of from about 25 micromoles per gram to about 150 micromoles per gram of water-immiscible solvent.

The organic dyes to be stabilized in the practice of this invention generally have their longest wavelength absorption peaks below about 700 nm. It is preferred that the longest wavelength absorption peak of the dye be in the range of from about 300 nm to about 700 nm and most preferred that it be in the range of from about 400 nm to about 700 nm. Further, the quenching compound has its longest wavelength absorption peak above about 600 nm, preferably above about 800 nm and most preferably in the range of from about 800 nm to about 1200 nm.

The following examples are included for a further understanding of the invention:

EXAMPLE 1-CONTROL

In a 15 ml beaker were placed 227 mg (228 μmoles) dye I-15, 1.7 g (1.5 ml) of mixed tricresyl phosphates, 10 ml of cosolvent 2-(2-butoxyethoxy)ethyl acetate. The resulting mixture was rapidly stirred until homogeneous, and then immediately passed through a shearing mill. After four additional passes, the mill was rinsed with 10 ml of distilled water and this added to the batch. The milled dye dispersion was briefly stirred and then placed in a 40° F (4.5° C) water bath to set the gel. When completely set, the dispersion was noodled and then washed overnight in a bath (40° F, 4.5° C) with continuously changing sweet water*. This reduced gel swelling and removed the water-soluble cosolvent. The noodled and washed dispersion was placed on a Teflon screen to dry. The resulting "dry" dispersion was assumed to have 13-15 percent residual water.

replaced with 100 μmole per square foot of coating of the yellow dye B-20.

The samples were subjected to a 2-day fading test. The results are recorded in Table 1.

TABLE 1

| EXAMPLE | DYE | CHELATED-METAL QUENCHER (6 μm/ft$^2$) | $\lambda_{max}$ OF DYE | $D_{max}$ (XENON + W2B) INITIAL | $D_{max}$ (XENON + W2B) EXPOSED | DENSITY LOSS AT $\lambda_{max}$ | $\phi_o/\phi$ |
|---|---|---|---|---|---|---|---|
| 1 | I-15 | — | 530 | 2.03 | 1.57 | 22% | — |
| 2 | I-15 | XI | 530 | 2.16 | 2.02 | 7% | 2.6-2.9 |
| 3 | I-15 | XII | 530 | 2.20 | 1.98 | 10% | 1.9-2.2 |
| 4 | B-20 | — | 424 | 1.29 | 0.90 | 30% | — |
| 5 | B-20 | XI | 424 | 1.50 | 1.25 | 16% | 1.2 |
| 6 | B-20 | XII | 424 | 1.54 | 1.27 | 18% | 1.2 |

*Sweet water is water which has been passed over alabaster stones to reduce hardness, chlorinated, and finally filtered.

To 3.99 g of the dye dispersion in a 50 ml beaker there were added 23 ml of distilled water. Making sure that the dispersion was wetted, the mixture was refrigerated for 4 hours to permit swelling of the gel. The resulting mixture was placed in a 100° F (38° C) water bath, 1 ml of a 7.5 percent solution of a spreading agent (saponin) added, the solution filtered, and the volume adjusted to 30 ml with distilled water. The dispersion was coated at 10 ml/ft$^2$ on 7 mil polyacetatebutyrate film base. The coating contained per square foot 50 μmoles of dye I-15, 382 mg of mixed tricresyl phosphates, and 600 mg of bone gel. This solution was heated on a hot plate with stirring to 100° C. When the dye was completely dissolved, the solution was poured into a previously prepared solution consisting of 22 ml of 12.5 percent aqueous bone gelatin, 22 ml distilled water, and 2 ml of a 10 percent solution of tri-isopropylnaphthalene sulfonic acid (DuPont Alkanol XC) maintained at 110° C in a water bath.

A sample of a first supported single-layer gelatin coating prepared as described above containing per square foot of coating 50 μmole of the magenta dye I-15 dispersed in water-immiscible solvent was spectrophotometrically evaluated by recording the spectral adsorption curve of the dye (optical density) vs wavelength). The peak density ($D_{max}$) of this sample was 2.03 at a wavelength ($\lambda_{max}$) of 540 nm, as is recorded in Table 1. The sample was reevaluated after having been submitted to a 5-day Xenon fading test (Wratten 2B filter). The resulting change in dye density is also recorded in Table 1.

EXAMPLE 2

The procedure described in Example 1 was repeated with a sample of a second coating which contained, in addition, 6 μmole per square foot of coating of the chelated-nickel compound XI. This was accomplished by adding 27.36 μmoles of the chelated-nickel compound XI to a phosphate/acetate solution of the type used as a starting material in Example 1. The results are recorded in Table 1.

EXAMPLE 3

The procedure described in Example 1 was repeated with a sample of a third coating which contained, in addition, 6 μmole per square foot of coating of the nickel compound XII. The results are recorded in Table 1.

EXAMPLES 4-6

The procedures described in Examples 1-3 were repeated with coatings wherein the magenta dye I-15 was The data recorded in TABLE 1 indicate that the two evaluated azomethine dyes were stabilized against radiation-induced fading in the presence of either of the two organic nickel compounds.

EXAMPLE 7

A film support was coated with 600 mg. per square foot of tricresyl phosphate 12.5 micromoles per square foot of the azomethine dye G-7 and 6 micromoles per square foot of the chelated-nickel compound I. The films were exposed to the light from a high intensity (5000 watt) xenon arc filtered by a Wratten 2B filter, alone or in combination with a Wratten 12 filter. For the sample exposed through the Wratten 2B filter alone, $\phi_o/\phi$ was found to be 3.6. When the Wratten 2B filter was combined with the Wratten 12 filter, $\phi_o/\phi$ was 2.0.

EXAMPLE 8

Example 7 was repeated except that dye F-2, coated at 50 μm/ft$^2$, was substituted for the G-7 dye employed therein. The value of $\phi_o/\phi$ using the Wratten 2B filter was 1.1; the value of $\phi_o/\phi$ using the Wratten 2B plus the Wratten 12 was 1.4.

EXAMPLE 9

Example 8 was repeated except that dye I-3 was used in place of dye F-2. Using only the Wratten 2B filter, $\phi_o/\phi$ was found to be 0.7, indicating acceleration of fading with the combination outside the scope of this invention since $\phi_o/\phi$ must be greater than 1.0. When exposed through the combination of filters, $\phi_o/\phi$ was 1.9.

EXAMPLE 10

Example 7 was repeated except that 50 μm/ft.$^2$ of chelated-nickel compound II was used in place of the 6 μm/ft$^2$ of compound I. After exposure through the Wratten 2B filter, $\phi_o/\phi$ was 0.23 indicating this combination to be outside the scope of this invention.

EXAMPLES 11-27

Various organic dyes in dimethyl formamide solution were tested for fading both alone in the presence of chelated-nickel quenching compounds. The solutions were 2 × 10$^{-4}$ molar in substrate compound and 5 × 10$^{-4}$ molar in quencher. Exposure was by means of a 450 watt Hanovia mercury lamp in combination with a Corning No. 4600 filter (infra-red absorbing) and a Schott No. GG395 filter (sharp cut, 80% transmittance at 395 nm). Details of the results are shown in Table 2.

TABLE 2
QUENCHING OF DYE FADING IN DMF BY CHELATED-NICKEL COMPOUNDS

| Example | Dye | Chelated Nickel Quencher | Percent Fade | $\phi_o/\phi$ |
|---------|-----|--------------------------|--------------|---------------|
| 11 | 47 | — | 83 | — |
| 12 | 47 | IV | 8.4 | 9.9 |
| 13 | 47 | VI | 10 | 8.3 |
| 14 | 47 | III | 0 | Very large |
| 15 | 48 | — | 37 | — |
| 16 | 48 | IV | 34 | 1.1 |
| 17 | 48 | III | 4.6 | 8.1 |
| 18 | 49 | — | 48 | — |
| 19 | 49 | V | 2 | 24 |
| 20 | 49 | VIII | 0 | Very large |
| 21 | 49 | VII | 0 | Very large |
| 22 | 50 | — | 100 | — |
| 23 | 50 | IV | 17 | 5.9 |
| 24 | 50 | III | 0 | Very large |
| 25 | 50 | V | 0 | Very large |
| 26 | 50 | VIII | 0 | Very large |
| 27 | 50 | VII | 0 | Very large |

EXAMPLE 28

A dimethyl formamide solution which was $2 \times 10^{-4}$ molar in dye 50, $10^{-4}$ molar in the chelated nickel compound III and $6 \times 10^{-3}$ molar in ammonium hydroxide (as an aid to solubility) was prepared and irradiated by means of a 450 watt mercury lamp filtered by a Schott OG-515 sharp cut filter (excludes light having a wavelength less than 500 nm) and a Schott KG-3 filter (infrared absorbing). The value of $\phi_o/\phi$ for this dye quencher combination was 2.4.

EXAMPLE 29

Example 28 was repeated except that dye 49 was used in place of dye 50. The value of $\phi_o/\phi$ was 9.1.

EXAMPLE 30

Example 28 was repeated except that the chelated nickel compound employed was $$2(C_4H_9)_4N^+ \left[ \begin{array}{c} NC \\ \\ NC \end{array} \begin{array}{c} S \\ \diagdown \\ S \end{array} Ni \begin{array}{c} S \\ \diagup \\ S \end{array} \begin{array}{c} CN \\ \\ CN \end{array} \right]^=$$

$\phi_o/\phi$ was 3.2.

EXAMPLE 31

Example 30 was repeated except that dye 49 was used in place of dye 50. The value of $\phi_o/\phi$ was 8.3.

EXAMPLE 32

Example 28 was repeated except that the chelated cobalt compound XIII was used in place of the chelated nickel compound III employed therein. The value of $\phi_o/\phi$ was 3.0.

EXAMPLE 33

Example 32 was repeated except that dye 49 was used in place of dye 50. $\phi_o/\phi$ was 7.7.

EXAMPLE 34

Example 28 was repeated except that the chelated copper compound XIV was used in place of the chelated nickel compound III employed therein. The value of $\phi_o/\phi$ was 2.5.

EXAMPLE 35

Example 34 was repeated except that dye 49 was used in place of dye 50. $\phi_p/\phi$ was 5.0.

EXAMPLE 36

Example 28 was repeated except that the chelated palladium compound XV was used in place of the chelated nickel compound III employed therein. The value of $\phi_o/\phi$ was 1.5.

EXAMPLE 37

Example 36 was repeated except that dye 49 was used in place of dye 50. $\phi_o/\phi$ was 1.6.

The invention has been described in detail with particular reference to certain preferred embodiments thereof, but it will be understood that variations and modifications can be effected within the spirit and scope of the invention.

We claim:

1. A photographic element comprised of a support and containing one or more hydrophilic coatings thereon, at least one of which is radiation-sensitive, and at least one of said hydrophilic coatings including an organic dye selected from azine dyes, oxazine dyes, thiazine dyes, anthraquinone dyes, azo dyes, azomethine dyes, cyanine dyes, diphenylmethane dyes, triphenylmethane dyes, formazan dyes, induline dyes, indigoid dyes, phthalein dyes and pyronine dyes or a precursor of such a dye, dispersed in a water-immiscible solvent therefor, wherein the improvement comprises a stabilizing amount of a chelated-metal quenching compound incorporated within said water-immiscible solvent for said organic dye or dye precursor; said quenching compound having its longest wavelength absorption peak bathochromic to the longest wavelength absorption peak of said organic dye and having a structure selected from the group consisting of $$A \diagup\diagdown \begin{array}{c} S \\ X \end{array} M \begin{array}{c} S \\ X' \end{array} \diagdown\diagup A \qquad I.$$

and $$Cat^+ \left[ A \diagup\diagdown \begin{array}{c} S \\ X \end{array} M \begin{array}{c} S \\ X' \end{array} \diagdown\diagup A \right] \qquad II.$$

wherein:

M is nickel, cobalt, copper, palladium or platinum; X and X' are independently selected from the group consisting of sulfur and oxygen; $Cat^+$ is a cation; and A is

[structure showing a benzene ring with R substituent, or a C=C group with C=O groups, or $R_1, R_2$ substituents]

wherein:

R is hydrogen or alkyl, and $R_1$ and $R_2$ are independently selected from the group consisting of hydrogen, phenyl, substituted phenyl, nitrile and alkyl.

2. A photographic element according to claim 1 wherein the longest wavelength absorption peak of the chelated-metal quenching compound is above about 600 nm.

3. A photographic element according to claim 1 wherein the longest wavelength absorption peak of the chelated-metal quenching compound is in the range of from about 800 nm to about 1200 nm.

4. A photographic element according to claim 1 wherein M is nickel.

5. A photographic element according to claim 1 wherein X and X' are both sulfur.

6. A photographic element according to claim 1 wherein the quenching efficiency is greater than about 2.0.

7. A photographic element according to claim 1 wherein the organic dye is selected from the group consisting of anthraquinone dyes, azine dyes, azo dyes, azomethine dyes and formazan dyes.

8. A photographic element according to claim 1 wherein the organic dye is an azomethine dye.

9. A photographic element comprised of a support and containing one or more hydrophilic coatings thereon, at least one of which is a radiation-sensitive silver halide emulsion, and at least one of said hydrophilic coatings including a photographic color coupler capable of forming an imaging dye selected from azo dyes and azomethine dyes upon reaction with an oxidized primary aromatic amine developing agent, said coupler being dispersed in a water-immiscible coupler solvent,
wherein the improvement comprises at least 0.25 micro mole of a chelated-metal quenching compound per gram of coupler solvent having its longest wavelength absorption peak above about 600 nm and bathochromic to the longest wavelength absorption peak of said imaging dye and, in the presence of said imaging dye, providing a quenching efficiency greater than 1.0; said chelated-metal quenching compound having a structure selected from the group consisting of

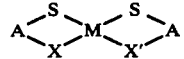

and

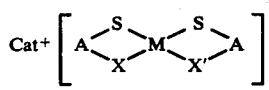

wherein:
M is nickel, cobalt, copper, palladium or platinum; X and X' are independently selected from the group consisting of sulfur and oxygen; Cat+ is a cation; and A is

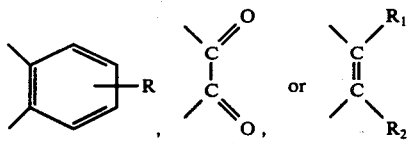

wherein:
R is hydrogen or alkyl, and $R_1$ and $R_2$ are independently selected from the group consisting of hydrogen, phenyl, substituted phenyl, nitrile and alkyl.

10. A photographic element according to claim 9 wherein said color coupler is a yellow-, magenta- or cyan-dye-forming coupler.

11. A photographic element according to claim 10 wherein said hydrophilic layer in which said color coupler is dispersed in a radiation-sensitive silver halide emulsion layer.

12. A photographic element according to claim 9 wherein said dye-forming coupler is capable of forming an azomethine dye when reacted with an oxidized primary amine silver halide developing agent.

13. A photographic element according to claim 9 wherein said color coupler is a yellow-dye-forming coupler containing at least one ketomethylene group.

14. A photographic element according to claim 9 wherein said color coupler is a 5-pyrazolone magenta-dye-forming coupler.

15. A photographic element according to claim 9 wherein said color coupler is phenolic or α-naphtholic cyan-dye-forming coupler.

16. A photographic element according to claim 9 wherein the quenching efficiency is greater than about 2.0.

17. A photographic element comprised of a support and containing at least one radiation-sensitive gelatino-silver halide emulsion coating thereon, said emulsion having incorporated therein a subtractive primary azomethine dye-forming coupler dispersed in a high-boiling water-immiscible coupler solvent,
wherein the improvement comprises from about 2.5 to 250 micromoles of a chelated-nickel quenching compound per gram of coupler solvent incorporated within said coupler solvent; said quenching compound having its longest wavelength absorption peak in the range of from about 800 nm to about 1200 nm and bathochromic to the longest wavelength absorption peak of said azomethine dye and, in the presence of said azomethine dye providing a quenching efficiency greater than 2.0; said chelated-nickel quenching compound having a structure selected from the group consisting of

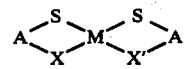

and

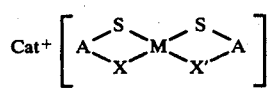

wherein M is nickel, cobalt, copper, palladium or platinum; X and X' are independently selected from the group consisting of sulfur and oxygen; Cat+ is a cation; and A is

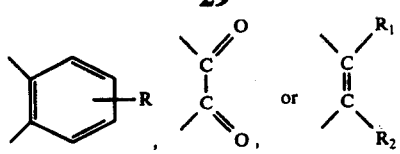

wherein R is hydrogen or alkyl, and $R_1$ and $R_2$ are independently selected from the group consisting of hydrogen, phenyl, substituted phenyl, nitrile and alkyl.

18. A photographic element according to claim 17 wherein the quenching efficiency is greater than 5.0.

19. A photographic element according to claim 17 wherein said azomethine dye-forming coupler is a yellow-dye-forming coupler containing at least one ketomethylene group.

20. A photographic element according to claim 17 wherein said azomethine dye-forming coupler is a 5-pyrazolone magenta-dye forming coupler.

* * * * *

UNITED STATES PATENT OFFICE
CERTIFICATE OF CORRECTION

Patent No. 4,050,938     Dated September 27, 1977

Inventor(s) Wendell F. Smith, Jr. and George A. Reynolds

It is certified that error appears in the above-identified patent and that said Letters Patent are hereby corrected as shown below:

Column 28, line 65,

"
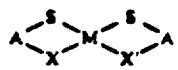  I and

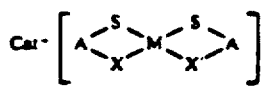  II wherein M is nickel, cobalt, copper, palladium or platinum; X and X' are independently selected from the group consisting of sulfur and oxygen;" should read --- I. 

wherein: $Cat^+$ is a cation; and A is --.

Column 28, lines 66-67, Delete "$Cat^+$ is a cation; and A is"

Signed and Sealed this

Thirteenth Day of June 1978

[SEAL]

Attest:

RUTH C. MASON
Attesting Officer

DONALD W. BANNER
Commissioner of Patents and Trademarks